United States Patent [19]

Jones et al.

[11] 4,226,757

[45] Oct. 7, 1980

[54] POLYPIVALOLACTONE POLYMER BLENDS

[75] Inventors: Jesse D. Jones; Edwin D. Hornbaker, both of Baton Rouge, La.

[73] Assignee: Ethyl Corporation, Richmond, Va.

[21] Appl. No.: 58,156

[22] Filed: Jul. 17, 1979

Related U.S. Application Data

[63] Continuation-in-part of Ser. No. 951,780, Oct. 16, 1978, abandoned.

[51] Int. Cl.$^2$ .................. C08K 3/10; C08L 67/00
[52] U.S. Cl. .................. 260/37 R; 525/186; 525/415
[58] Field of Search .......... 260/823, 37 R, 40 R; 528/354, 359; 525/415

[56] References Cited

U.S. PATENT DOCUMENTS

| | | | |
|---|---|---|---|
| 3,268,486 | 8/1966 | Klootwijk | 528/354 |
| 3,471,456 | 10/1969 | Klootwijk | 528/359 |
| 3,476,714 | 11/1969 | Hoegger | 264/175 |
| 3,560,450 | 2/1971 | Curotti | 528/359 |
| 3,669,940 | 6/1972 | Desgurse et al. | 528/354 |
| 3,773,726 | 11/1973 | Vollkommer et al. | 528/359 |

*Primary Examiner*—Theodore E. Pertilla
*Attorney, Agent, or Firm*—Donald L. Johnson; John F. Sieberth; Frederick A. Stolzle, Jr.

[57] ABSTRACT

Intimate mechanical blends of polypivalolactone resins of different molecular weights wherein parts molded from the mechanical blends have improved resistance against warpage without diminution of other important physical properties of the higher molecular weight resin.

8 Claims, No Drawings

POLYPIVALOLACTONE POLYMER BLENDS

The present application is a continuation-in-part of Ser. No. 951,780 filed Oct. 16, 1978, now abandoned entitled "Polypivalolactone Polymer Blends".

INTRODUCTION

This invention relates to mechanical blends of polypivalolactone (PPL) resins wherein the resinous components are of different molecular weight. More specifically, this invention relates to intimate mechanical blends of a higher molecular weight polypivalolactone resin with a lower molecular weight polypivalolactone resin wherein parts molded from these resinous blends exhibit increased resistance to warpage.

BACKGROUND OF THE INVENTION

Polypivalolactone is a well known thermoplastic material. Methods for its synthesis are described, for example, in U.S. Pat. Nos. 3,268,486, 3,471,456, 3,669,940 and 3,773,726 which patents are incorporated herein by reference. Applications for polypivalolactone include its use in making films (e.g., U.S. Pat. No. 3,476,714) and in making molded articles where high compressive strength, hardness, and high heat resistance are desirable. Mayne, in a paper entitled "The Polymerization of Polypivalolactone", published in Chemtech, (December 1972) points out the usefulness of polypivalolactone as an engineering thermoplastic because of its high heat resistance.

Notwithstanding the many desirable qualities of polypivalolactone, a problem associated with structural articles molded from polypivalolactone is their tendency to warp to an excessive extent. This problem occurs in articles molded by various methods known to the art, e.g., injection molding, compression molding, extrusion molding, blow molding, etc., and is especially troublesome when parts are molded with certain geometries (e.g., large, thin, rigid sections) and in configurations where uniformity and/or close tolerances are required. For these applications, low warpage in the finished part is a prime requisite.

It is therefore an object of the present invention to provide polypivalolactone blends that exhibit low warpage when molded by the various methods known to the art.

It is a further object of the present invention to provide polypivalolactone blends wherein warpage of the molded parts is greatly reduced without diminution of the other important physical properties of polypivalolactone.

Other objects and advantages of this invention will be apparent from the ensuing disclosure and the appended claims.

SUMMARY OF THE INVENTION

Accordingly, moldable thermoplastic resin compositions are provided which comprise an intimate mechanical blend of a first polypivalolactone resin having an LVN of from about 1.3 to about 2.5 as measured in benzyl alcohol at 150° C., and from about 5 to about 50 phr (based on the weight of said first resin) of a second polypivalolactone resin having an LVN of less than about 1.2 also as measured in benzyl alcohol at 150° C., preferably from about 15 to about 35 phr of the second resin. Most preferably the blend contains 15 to 25 phr of polypivalolactone having an LVN less than 1.2. In another preferred embodiment the composition also contains from about 10 phr to about 100 phr of a reinforcing filler based on the weight of the first higher molecular weight polypivalolactone. Generally, fiber fillers (e.g., fiberglass) and particulate fillers (e.g., alumina, silica, mullite, graphite, and calcium magnesium aluminosilicate) may effectively be incorporated into the blends of the present invention. These fillers may be incorporated into the blends individually or in combination with other fillers herein described.

The thermoplastic polypivalolactone resin used in the present invention is a linear condensation polymer consisting substantially of recurring ester structure units of the formula:

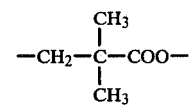

Such resins can be produced by known methods such as by polymerizing hydroxypivalic acid or its esters as described in the patents and paper of Mayne cited above.

Polypivalolactone resins having a Limiting Viscosity Number (LVN) greater than about 1.3 generally have more desirable physical properties than polypivalolactone resins having an LVN below about 1.3. However, the problem of warpage is more significant in parts molded from these higher molecular weight resins. The present invention provides mechanical resin blends wherein the warpage of parts molded from the blends is significantly reduced or eliminated while the desirable physical properties of the higher molecular weight polypivalolactone are retained.

The term "warpage" for purposes of the present invention is a measure of the deflection or distortion experienced in standard sized molded plastic articles. The amount of warpage that may be tolerated in the finished part involves consideration of such factors as the function which the part is to perform and the size of the part. For some structural or mechanical applications (e.g., automobile parts, such as distributor caps, and various mechanism parts such as timing gears) a complete lack of warpage is desirable, while other applications (e.g., television cabinets) may require less rigid warpage standards.

In forming the blends of the present invention it is preferred to form mechanical melt-blends which result in intimate mixtures of the polymer components. They can be prepared by any of the procedures ordinarily used to mix or compound other conventional polymeric masses. For example, the two resin batches can be mixed or blended together in a ribbon blender, a differential speed roll mill, a Hobart mixer, a paddle blender, or the like. When hot processing techniques are employed, it is advantageous to conduct at least a portion of the mixing at temperatures high enough, e.g., above about 230° C., to flux the resin mass in order to achieve the maximum uniformity of product.

In order to more fully illustrate the present invention, reference is made to the following example.

EXAMPLE 1

A blend was prepared by mechanically mixing polypivalolactone resin having an LVN of 1.4 and polypivalolactone resin having an LVN of 1.0 and processing the mixture on an injection molding machine into parts suitable for grinding into pellets. Test specimens were injection molded from spherical pellets ranging from approximately ⅛" to 5/15" in diameter. All test specimens, including the comparative specimens were reinforced with 39.62% of calcium magnesium aluminosilicate (83 phr for Blend of the Invention and 67 phr for the comparative resin) and were produced using a New Britain reciprocating screw injection molding machine in which the mold temperature was maintained at about 165° F. The barrel temperatures in the machine were set at about 480° F. and the machine was operated semi-automatically with a screw back pressure of about 100 psig, a mold cycle time of about 30 seconds and an injection time of about 1.0 to 1.5 seconds. The initial several specimens of each composition were discarded and only those specimens made after the machine had equilibrated were tested.

The Table shows the average warpage of molded specimens of reinforced polypivalolactone having an LVN of 1.4 and the average warpage of molded specimens of a blend of this invention. The specimens, plaques 9 inches by 9 inches by 1/16 of an inch, were allowed to set at room temperature for 24 hours and were then placed on a flat surface where three sides were secured by C-clamps, thus permitting the fourth side freedom to buckle. For each plaque three measurements were made involving a clamp arrangement yielding a different unclamped side. The average distance in mm. between the flat surface and the part of the clamped plaque farthest away from the flat surface is the warpage listed in Table I.

TABLE I

| Warpage Comparison | |
| --- | --- |
| Composition | Warpage (mm) |
| Blend of Invention[1] | 1.3 |
| Comparative Resin[2] | 2.5 |

[1]An intimate mechanical blend of 100 phr of polypivalolactone having an LVN of 1.4 and 25 phr of polypivalolactone having an LVN of 1.0, both as measured in benzyl alcohol at 150° C. and stabilized with 0.05 wt. percent dicetylsulfide; 83 phr calcium magnesium aluminosilicate (processed mineral fiber, Jim Walter Resources, Inc.); 0.63 phr of TiO$_2$; 1.09 phr of coupling agent A-187, ($\gamma$-glycidoxypropyltrimethoxysilane, a product of Union Carbide Corporation); and 0.126 phr of "Ethyl" Antioxidant 330, [1,3,5-Trimethyl-2,4,6-tris(3,5-di-tert-butyl-4-hydroxy benzyl) benzene, a product of Ethyl Corporation].
[2]An intimate mechanical blend of 100 phr of polypivalolactone having an LVN of 1.4 measured as in footnote [1] above; 67 phr calcium magnesium aluminosilicate; 0.50 phr of TiO$_2$; 0.87 phr of A-187; and 0.101 phr of "Ethyl" Antioxidant 330, all as above.

EXAMPLE 2

In this instance unreinforced blends of the present invention as well as a comparative unreinforced example were prepared and the warpages of each were measured. The resins used in preparation of the unreinforced blends and of the comparative example and the procedure for compounding and molding were the same as those employed in Example 1. The method used for the measurement of warpage was also the same except that the warpage in each case is an average of the five plaques. Table II below tabulates the results.

TABLE II

| COMPOSITION | Blend #1 | Blend #2 | Comparative Example |
| --- | --- | --- | --- |
| 1.4 LVN PPL | 50 phr | 80 phr | 100 phr |
| 1.0 LVN PPL | 50 phr | 20 phr | — |
| "330"[1] | 0.1 phr | 0.1 phr | 0.1 phr |

TABLE II-continued

| COMPOSITION | Blend #1 | Blend #2 | Comparative Example |
| --- | --- | --- | --- |
| WARPAGE | 21.6 mm | 24.5 mm | 29.3 mm |

[1]"Ethyl" Antioxidant 330, [1,3,5-Trimethyl-2,4,6-tris(3,5-di-tert-butyl-4-hydroxy benzyl) benzene, a product of Ethyl Corporation].

As illustrated in Example 1, preferred blends of this invention contain a reinforcing amount of a reinforcing filler. Although the quality of filler incorporated into these blends involves, among other factors, considerations of the physical properties desired of the composition, the quantity generally ranges up to about 100 phr based on the weight of the higher molecular weight resinous component of the blend. In a preferred embodiment, the blends contain from about 10 phr to about 100 phr of reinforcing filler, most preferably from about 20 to about 90 phr. Examples of suitable fillers which may be used in the practice of this invention include such materials as fiberglass, alumina, silica, mullite, graphite, wollastonite, mica, asbestos (such as amosite, chrysotile or crocidolite) and other metal silicates, phosphates, aluminates, aluminosilicates, sulfates, sulfides, carbides, etc., other inorganic compounds such as potassium titanate, sodium aluminum carbonate, boron carbide, silicon carbide, silicon nitride and tungsten boride; and armorphous materials such as the preferred calcium magnesium aluminosilicate.

It is also desirable that coupling agents be included in the resinous blends when a reinforcing filler is used in order to enhance the attraction between the filler and the polymers constituting the blends. Such coupling agents are described in U.S. Pat. No. 4,089,838, issued May 16, 1978 which is incorporated herein as if fully set forth. Examples of desirable coupling agents are $\gamma$-aminoalkyltrialkoxysilane, (e.g., $\gamma$-aminopropyltriethoxysilane), $\gamma$-glycidoxyalkyltrialkoxysilane, (e.g., $\gamma$-glycidoxypropyltrimethoxysilane), N-$\beta$-(aminoethyl)-$\gamma$-aminoalkyltrialkoxysilane (e.g., N-$\beta$-(aminoethyl)-$\gamma$-aminopropyltrimethoxysilane). When incorporated into the blends of the present invention it is desirable that the coupling agent be present in an amount of from about 0.01 phr to about 20 phr based on the weight of the higher molecular weight resinous component of the blend. Preferably the coupling agent is present in the amount of from about 0.05 to about 10 phr.

In another preferred embodiment the resinous blends of the present invention may also contain flame retardants. While many varieties of organic and inorganic flame retardants are known for use in thermoplastic resins, it is preferred that ammonium polyphosphate and optionally a polybrominated aromatic compound and a synergist be used in the practice of this invention. Ammonium polyphosphate is a desirable flame retardant because of its effectiveness in enhancing the flame resistancy of polypivalolactone and blends thereof without adversely affecting desirable properties such as, for example, color, hardness and high heat resistance. The amount of ammonium polyphosphate incorporated into the resinous blends of the present invention will usually involve consideration of the amount of flame resistance desired. Generally, ammonium polyphosphate comprising up to 100 phr of the weight of the higher molecular weight resinous component of the blend provides adequate flame resistancy. In the most preferred embodiments the blends of the present invention contain from about 10 to about 40 phr of ammonium polyphosphate.

Copending application Ser. No. 851,051 filed Nov. 14, 1977, the disclosure of which is incorporated herein as if fully set forth, describes in detail the use of such preferred flame retardants in polypivalolactone.

In addition to ammonium polyphosphate, other flame retardant materials may be incorporated into the compositions of this invention. The incorporation of certain polybrominated aromatic compounds into these compositions is particularly desirable. Exemplary materials include pentabromotoluene, tetrabromophthalic anhydride, tetrabromophthalic acid, 3,5,3',5'-tetrabromobiphenyl ether, 2,2',4,4',6,6'-hexabromobiphenyl, 2,2-bis(3,3',5,5'-tetrabromo-4-4'-dihydroxyphenyl)propane, and bis(pentabromophenoxy)butane. Preferred polybrominated aromatics are decabromodiphenyl oxide, and bis(dimethoxyphosphinyl)tetrabromo-p-xylene. When incorporated into the blends of the present invention it is desirable that the amount of polybrominated aromatic flame retardant range up to about 15 phr (preferably from about 4 to about 9 phr).

Synergists or compounds which enhance the effectiveness of the flame retardants used in the blends of the present invention may also be incorporated into the blends of the present invention. Such metal compounds as salts and oxides of antimony, arsenic, bismuth, molybdenum, tin, tungsten, zinc, etc., are useful as synergists. The preferred synergists are the oxides and salts of antimony. When incorporated into the blends of the present invention it is desirable that the synergist be present in the amount of up to about 15 phr of the weight of the higher molecular weight resinous component of the blend.

Other ingredients may also be incorporated into the blends of the present invention in accordance with the particular function to be served by the blend. By way of example, a nucleating agent may be used in the blends to provide maximum toughness. See U.S. Pat. No. 3,471,455. Likewise, impact modifiers may be utilized, including such materials as methacrylated butadiene-styrene polymers (see U.S. Pat. Nos. 2,857,360 and 2,943,074), blends of polymethylmethacrylate and graft copolymer resins (see U.S. Pat. No. 3,170,964), ethylene-vinyl acetate copolymers, ethylene-acrylate copolymers and other commercially available MBS or acrylic types.

Other ingredients which may be incorporated into the blends of this invention are antioxidants, colorants, pigmenting agents, heat stabilizers, lubricants, light stabilizers, plasticizers, mold release agents, processing aids, etc. Examples of suitable antioxidants are 1,3,5-trimethyl-2,4,6-tris(3,5-di-tertbutyl-4-hydroxybenzyl)-benzene, 4,4'-methylene-bis(2,6-di-tertbutylphenol); and N-phenyl-β-naphthalene. Desirable amounts of antioxidant, for purposes of the present invention, range from about 0.001 phr to about 1 phr based on the weight of the higher molecular weight resinous component of the blend. Of the various colorants or pigmenting agents which may be incorporated in the compositions of the present invention, it is generally desirable to employ titanium dioxide, particularly in an amount of from about 0.05 phr to about 1 phr. Examples of suitable heat stabilizers are tri-(nonylphenyl)phosphite, and dihydrocarbyl sulfides such as didecylmono- and disulfide, dioctadecylmono- and disulfide, and dicetyl sulfide. See U.S. Pat. No. 3,632,552.

It is a further aspect of the present invention that, when desirable, the intimate mechanical blending of three or more polypivalolactone resins of different molecular weights be effected. For example, intimate mechanical blends of a high, a medium, and a low molecular weight polypivalolactone resin which exhibit desirable physical or chemical properties and low warpage characteristics may be made by the teachings of this disclosure.

Blends of the present invention may be used for molding electrical or electronic compouents, e.g., plug connections, hair dryer parts, flexible printing circuit, TV parts, etc., and mechanical components, e.g., motor covers, automobile components, medicine containers, etc.

Other modifications and variations of the present invention will now be readily apparent in light of the above teachings. It is therefore to be understood that changes may be made in the particular embodiments described above which are within the spirit and intended scope of the invention as defined in the appended claims.

What is claimed is:

1. A moldable thermoplastic resin composition comprising an intimate mechanical blend of a first polypivalolactone resin having an LVN of from about 1.3 to about 2.5 as measured in benzyl alcohol at 150° C., and from about 5 to about 50 phr (based on the weight of said first resin) of a second polypivalolactone resin having an LVN of less than about 1.2 as measured in benzyl alcohol at 150° C.

2. The composition of claim 1 wherein said composition also includes from 10 phr to 100 phr of a reinforcing filler, based on the weight of said first resin.

3. The composition of claim 2 wherein said reinforcing filler is present in an amount of from about 20 to about 90 phr.

4. The composition of claim 1 wherein said first polypivalolactone resin has an LVN of about 1.4 and wherein said second polypivalolactone has an LVN of about 1.0.

5. The composition of claim 1 wherein said second polypivalolactone resin is present in an amount of from about 15 phr to about 35 phr.

6. The composition of claim 1 wherein said second polypivalolactone resin is present in an amount of from about 15 phr to about 25 phr.

7. A moldable thermoplastic resin composition comprising an intimate mechanical blend of (a) a first polypivalolactone resin having an LVN of about 1.4 as measured in benzyl alcohol at 150° C., (b) from about 15 to about 35 phr of a second polypivalolactone resin having an LVN of about 1.0 as measured in benzyl alcohol at 150° C., and (c) from about 20 to about 90 phr of a reinforcing filler based on the weight of (a).

8. The composition of claim 7 wherein said second polypivalolactone resin is present in an amount of from about 15 phr to about 25 phr.

* * * * *